United States Patent [19]

Bourganel

[11] 4,026,977
[45] May 31, 1977

[54] PREPARATION OF ANISOTROPIC SEMI-PERMEABLE MEMBRANES OF POLYARYL ETHER/SULPHONES

[75] Inventor: Jack Bourganel, Lyon, France
[73] Assignee: Rhone-Poulenc S.A., Paris, France
[22] Filed: May 19, 1972
[21] Appl. No.: 254,882

[30] Foreign Application Priority Data

May 24, 1971 France .............................. 71.18635

[52] U.S. Cl. ................................ 264/41; 210/23 H; 210/500 M; 264/45.8; 264/216
[51] Int. Cl.$^2$ ........................................ B01D 31/00
[58] Field of Search .............. 210/22, 23, 321, 490, 210/500; 264/41, 49, 45.8, 216; 260/2.2 R

[56] References Cited

UNITED STATES PATENTS

| | | | |
|---|---|---|---|
| 3,551,331 | 12/1970 | Cescon et al. ................... | 264/41 X |
| 3,567,810 | 3/1971 | Baker ............................. | 210/500 X |
| 3,592,672 | 7/1971 | Rowley et al. ................. | 210/500 X |
| 3,615,024 | 10/1971 | Michaels ........................ | 210/500 X |
| 3,691,068 | 9/1972 | Cross ............................. | 210/22 |
| 3,709,841 | 1/1973 | Quentin ......................... | 260/2.2 R |

*Primary Examiner*—Frank A. Spear, Jr.
*Attorney, Agent, or Firm*—Stevens, Davis, Miller & Mosher

[57] ABSTRACT

Anisotropic sulphonated polyaryl ether/sulphone membranes having good salt rejection and flow rates making them particularly suitable for use in osmosis and ultrafiltration are provided by casting a solution of the polymer on a support, immersing the supported film in a coagulating bath and then recovering the film, in which:

a. the sulphonated polyaryl ether/sulphone used possesses between about 0.3 and 2 meg/g of sulphonic acid groups and a reduced specific viscosity of between about 40 and 200 cm$^3$/g (measured as a 2 g/l solution in DMF at 25° C);

b. the concentration of the casting solution is between about 5 and 60% w/v;

c. the coagulation bath comprises, per 100 parts of water, about 5 to 100 parts of a salt formed by an anion of a strong inorganic acid and a metal cation and about 1 to 120 parts of a solvent for the polymer;

d. the temperature of the coagulation bath is between about −30 and +30° C;

e. the period of immersion in the coagulation bath is between about 30 seconds and 60 minutes; and f. the immersion of the film in the coagulation bath is preceded by gelling the polymer layer.

14 Claims, No Drawings

PREPARATION OF ANISOTROPIC SEMI-PERMEABLE MEMBRANES OF POLYARYL ETHER/SULPHONES

The present invention relates to a process for the preparation of anisotropic semi-permeable membranes of sulphonated polyaryl ether/sulphones and to the membranes produced.

The terms "anisotropic" and "asymmetric" are used synonomously to denote membranes the two faces of which have different structures.

Sulphonated polyaryl ether/sulphones have already been described (see, for example, Belgian Pat. No. 749,763), as have the membranes prepared from these polymers. These polymers contain a plurality of units of the formula:

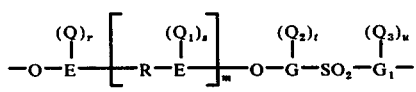

(I)

and, optionally, units of the formula:

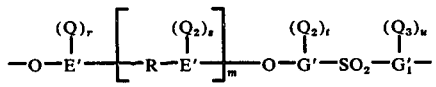

(II)

in which each of E, G and $G_1$, which may be identical or different, is an aromatic group, at least one of which contains, by way of a substituent, one or more sulphonic acid groups, it being possible for the number of sulphonic acid groups per aromatic group to vary from one unit to the other; each of E', G' and $G'_1$, which may be identical or different, differ from E, G and $G_1$ only in the absence of sulphonic acid groups; each of Q and $Q_1$, which may be identical or different, represents a substituent which is inert to sulphonation, such as alkyl radicals with 1 to 4 carbon atoms or halogen atoms such as fluorine, chlorine, bromine or iodine; each of $Q_2$ and $Q_3$, which may be identical or different, represent an electron-attracting group, such as nitro, phenylsulphone, alkylsulphone, trifluoromethyl, nitroso or pyridyl groups; each of $r$, $s$, $t$ and $u$, which may be identical or different, is O or an integer from 1 to 4 inclusive, at least one of them being less than 4; $m$ is equal to O or 1; and R represents a valency bond or a radical chosen from —CO—, —O—, —$SO_2$— and divalent organic hydrocarbon radicals such as alkylene, alkylidene, cycloalkylene and arylene radicals, these radicals preferably having less than 7 carbon atoms.

The sulphonated polyaryl ether/sulphones described in the abovementioned patent contain between 0.1 and 5 milliequivalents, per gram (meg/g) of dry polymer, of sulphonic acid groups. They can be produced by the sulphonation, according to any known process, of polyaryl ether/sulphones containing a plurality of units of formula (II). The latter polymers can be prepared as described in French Pat. No. 1,407,301.

It is also known, from the abovementioned Belgian Patent for example, that membranes of sulphonated polyaryl ether/sulphones are particularly useful for the fractionation of solutions by direct or reverse osmosis. Finally, asymmetric membranes of sulphonated polyaryl ether/sulphones, preferably produced by casting a polymer solution and then coagulating one of the faces of the solvent-impregnated film thus produced, have been described in the abovementioned Belgian Patent. Such membranes have a thin dense layer, forming the active layer of the membrane, and a thicker porous layer acting as a reinforcing support.

According to the present invention there is provided a process for producing an asymmetric semi-permeable membrane of a sulphonated polyaryl ether/sulphone which can be used for the fractionation of the different constituents of a solution, especially by osmosis or ultrafiltration, which allows membranes to be produced which possess particularly advantageous properties, in particular as far as the degree of rejection and the flow rate are concerned.

By "degree of rejection," as used herein, is meant the ratio:

$$100 \left(1 - \frac{\text{concentration of the solution after filtration}}{\text{concentration of the solution before filtration}}\right).$$

It will be appreciated that the terms "osmosis" and "ultrafiltration" involve, respectively, the fractionation of solutions of compounds of low and high molecular weight. The molecular weight limit is usually fixed in the vicinity of 500.

The present invention provides a process which comprises casting a solution of a sulphonated polyaryl ether/sulphone, immersing the support coated with the layer of polymer in a coagulating bath and then recovering the resulting membrane, in which a. the sulphonated polyaryl ether/sulphone used possesses between 0.3 and 2 meg/g of sulphonic acid groups and a reduced specific viscosity, measured as a 2 g/l solution in DMF at 25° C, of between 40 and 200 $cm^3/g$;

b. the concentration of the casting solution is between 5 and 60% (expressed in g of polymer per $cm^3$ of solution);

c. the coagulating bath comprises, per 100 parts by weight of water, 5 to 100 parts of a salt formed from an anion of a strong inorganic acid and a metal cation and 1 to 120 parts of a solvent for the polymer;

d. the temperature of the coagulation bath is between —30° and +30° C;

e. the period of immersion in the coagulation bath is between 30 seconds and 60 minutes; and f. the immersion of the film in the coagulation bath is preceded by gelling the film.

The process of this invention can be applied to different types of sulphonated polyaryl ether/sulphones containing units of formula (I) and optionally (II). It must be understood that the term "sulphonic acid" denotes a group of the formula

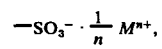

in which M denotes a hydrogen ion or an alkali metal ion or an alkaline-earth ion and $n$ is an integer equal to 1 or 2.

The polymers which are preferably used are those consisting of units I and II in which the symbols E, G and $G_1$ represent p-phenylene groups of which at least one contains, by way of substituents, one or more sulphonic acid groups, E', G' and $G'_1$ represent a p-phenylene radical, $r$, $s$, $t$ and $u$ are zero, $m$ is equal to 1 and R represents the

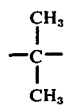

radical.

In order to prepare a solution of this sulphonated polyaryl ether/sulphone, the various known solvents for this polymer can be used; in particular, aprotic polar solvents, such as dimethylformamide (DMF), dimethylacetamide (DMAC), dimethylsulphoxide (DMSO), hexamethylphosphotriamide (HMPT), sulpholane, ethylene carbonate or mixtures of these solvents, can be used. A mixture of one or more of these solvents with a proportion which can be as much as 50% relative to the total weight of the solvents, of a liquid of low boiling point (for example less than 90° C), which is a solvent or swelling agent for the polymer, can also be used, as will be explained later. Examples of such solvents or mild swelling agents are dichloromethane, acetone, methyl ethyl ketone and tetrahydrofurane.

In order to facilitate the coagulation of the polymer film, a proportion, which can be as much as 10% relative to the total weight of the products other than the polymer, of a non-solvent for the polymer can also be added to the casting solution. As examples of such non-solvents, there may be mentioned water, dioxane, urea, formamide, methanol, ethanol, chloroform, isopropyl alcohol and diethyl ether. Preference however, is given to water or to products which are miscible with the water of the coagulation bath.

The concentration of the casting solution is preferably between 30 and 55%. Dissolving the polymer and casting it in the form of a film can usually be carried out at ambient temperature (20° to 25° C). It is however possible to depart from this temperature and, in general, these operations can be carried out at a temperature of between 0° and 100° C.

The support used to form the film can be of varied nature and shape; in particular, it can be a plane surface, such as a plate of glass or metal, or a metal belt for continuous manufacture. The support can also be, for example, cylindrical, conical, spiral or any other suitable shape depending on the shape which it is desired to give to the membranes. The support can also be covered with a reinforcement intended to reinforce the membrane. This reinforcement can consist of a woven fabric, a net or a knitted fabric, which may be of vegetable origin such as cotton or of synthetic origin such as polyamide or polyester.

The thickness of the membrane after coagulation is substantially different from the thickness of the film measured before the coagulation. After coagulation, the thickness of the coagulated membrane is usually between 50 and 400 $\mu$; it depends both on the thickness of the film cast, and on the subsequent treatment conditions (gelling and coagulation). By way of indication the thickness of the cast film is usually between 100 and 500 $\mu$.

Between the stages of casting the film and immersing the latter in the coagulation bath, the process of the invention comprises gelling the film; the term "gelling" usually denotes the conversion of a layer of polymer solution to a non-fluid state in the absence of stress, the polymer remaining heavily impregnated with solvent, and retaining the disordered macromolecular distribution. Various means can be used in order to bring about this gelling. It is thus possible to achieve it by removal of solvent, for example by simple exposure to the atmosphere or, more quickly, by flushing the surface of the film with an anhydrous and inert gas such as dry nitrogen. It is also possible to accelerate the gelling, for either procedure, by gentle heating (for example, up to 50° C). These two techniques are particularly effective if the casting solution contains a mild solvent or swellin agent such as those mentioned previously. Another way of gelling is to lower the temperature. This technique, which can be used especially when a mild solvent or swelling agent has not been employed, has the additional advantage of increasing considerably the flow rate of the membranes. In general, the temperature can be lowered to −30° C, between 0° and −20° C being the operating temperature preferably used. The dwell time at this temperature is usually between 30 seconds and 20 minutes, preferably 1 to 10 minutes, and the gelling time in air or in a current of inert and anhydrous gas usually varies between 5 seconds and 10 minutes depending on the temperature.

As has been stated previously, the nature of the coagulation bath is an essential feature of the process of this invention. This bath consists of water, a solvent for the polymer and an inorganic salt, in the proportions indicated. This salt is derived from an anion of a strong inorganic acid and from a metal cation. By "strong acid," as used herein, is meant an acid which is completely dissociated when it is dissolved in water or an acid which has a pK less than 3. Examples of such acids include sulphuric acid, hydrochloric acid, nitric acid, chromic acid, phosphoric acid and iodic acid. The metal cation can orginate from an alkali metal, an alkaline-earth metal or a transition metal i.e. from groups 1A, 2A, 1B to 7B and 8 of the periodic classification of the elements as it is shown in the Handbook of Chemistry and Physics by Robert C. WEAST, 51st edition, published by The Chemical Rubber Co.

Particular examples of salts which can be used are the nitrates, sulphates and phosphates of sodium, calcium, aluminum and zinc; the chlorides and bromides of lithium, sodium, potassium, magnesium, barium, calcium, zinc and aluminum; and sodium chromate and potassium chromate.

The solvent used in the coagulation bath can be chosen from amongst the polymer solvents already mentioned. Preferably, DMF is used as the solvent and sodium nitrate is used as the salt; the composition of the coagulation bath is preferably as follows: 20 to 75 parts of the inorganic salt and 10 to 100 parts of solvent per 100 parts by weight of water. The temperature of the coagulation bath is preferably between −20° and +20° C.

The duration of the treatment of the film in this bath is preferably between 10 and 30 minutes. When the coagulation is complete, generally within these time limits, the membrane separates from its support.

The membranes, which may or may not be reinforced, produced according to the process of this invention, can be handled and used in an aqueous medium. They can also and this is one of the most advantageous properties of these membranes, be dried and then rehydrated and still substantially retain their properties.

The membranes of this invention can be used particularly for the ultrafiltration of various solutions, in particular those containing enzymes, proteins, nucleic acids or other heat-liable products which cannot be isolated by distillation. They can also be used in the treatment of sugary juices, fruit juices, meat extracts, beetroot juice, whey, industrial effluents especially the effluents from paper mills, for example.

The membranes of this invention intended for use in the treatment of solutions by osmosis are preferably subjected to a supplementary treatment with the aim of contracting the structure of the membranes. Various means can be employed to achieve this result. In particular, a heat treatment which directly affects the physical nature of the polymer can be carried out. A practical means of carrying out this treatment consists of immersing the membranes for one minute to 60 minutes in an aqueous solution of an inorganic salt brought to a temperature of between 100° and 150° C, preferably between 125° and 140° C. The concentration of the salt solution is usually between 5 and 70%, preferably between 10 and 60% (g of salt/cm$^3$ of water). The inorganic salt used can be chosen from amongst the salts used to prepare the coagulation bath. The same or different salts can be used in both operations.

The osmotic properties of the membranes can also be improved by treating the membrane with a dehydrating agent. Dehydrating agents are numerous, and as long as it is inert to the polymer, practically any compound with an affinity for water can be used. However, it has been found that excellent results are obtained by treating the membrane with one or more compounds containing one or more alcoholic OH groups or with an aqueous solution of these alcohols used in the liquid or vapour state and at a temperature of between 20° and 80° C. Thus aliphatic or cycloaliphatic, primary, secondary or tertiary monoalcohols or polyalcohols which contain from 1 to 20 carbon atoms or polyalkylene glycols can be used. The duration of this treatment with a dehydrating agent is a function of the nature of the agent and of the temperature. In general, it can vary between 10 seconds and 24 hours. In the particular case of ethanol at a temperature of between 40° and 70° C, it usually varies between 30 seconds and 3 minutes.

These treated membranes naturally also form part of this invention. Not a single pore can generally be detected on one of the faces of the membranes when a surface examination of these membranes is carried out with an electron microscope at a magnification of 20,000. On the other face, on the other hand, the presence of pores, the average diameter of which varies between 0.1 and 1 $\mu$, can be observed. An examination in cross-section reveals the existence of a dense and extremely thin layer corresponding to the non-porous surface, and a much thicker layer containing numerous pores.

A study of the osmotic properties of such a membrane, by comparison with the properties of a membrane produced by simple casting of a solution of the same polymer and evaporating the solvent (a so-called "dense" membrane), enables the thickness of the active layer, that is to say the layer which is free of pores, to be estimated. The comparison can be made in relation to the flow rate for an identical degree of salt rejection. The thickness of the dense layer of the membranes of this invention, estimated according to this method, is usually between 0.01 and 0.5 $\mu$.

The membranes also possess the useful property of being able to be dried. They can be used especially for the fractionation of salt solutions, for example sea water, according to reverse osmosis techniques. The degree of salt rejection of these membranes is usually greater than 75% and can exceed 90%; the flow rate can exceed 2,000 liters/day.m$^2$ under a pressure of 60 bars.

Apart from desalinating sea water, the membranes are of considerable value in the treatment of industrial waters containing other salts, in particular salts of calcium and magnesium, especially the carbonates and bicarbonates.

The apparatuses which may contain these membranes are of any known type. In particular, the apparatusus described by ULRICH MERTEN in "Desalination by Reverse Osmosis" (p.239–270; 1966) edited by "The Riverside Press", or SOURIRAJAN "Reverse Osmosis," LOGOS PRESS Ltd., 1970, can be used.

The following Examples further illustrate the present invention.

EXAMPLE 1 to 19

A solution A is prepared by dissolving 12.5 g of polyaryl ether/sulphone in 150 cm$^3$ of 1,2-dichloroethane (DCE). The polyaryl ether/sulphone used contains a plurality of units of the formula:

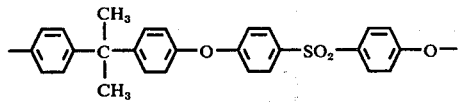

A solution B is prepared by dissolving 3.3 g of chlorosulphuric acid (HClSO$_3$) in 30 cm$^3$ of DCE.

The two solutions A and B are introduced simultaneously and gradually (over a period of one hour) and with vigorous stirring (436 revolutions/minute) into a 500 cm$^3$ flask, equipped with a stirrer, held at −10° C and containing 50 cm$^3$ of DCE. The stirring is continued and the temperature is maintained for a further 4 hours. The precipitate is filtered off and washed with 100 cm$^3$ of DCE. It is redissolved in 50 cm$^3$ of dimethylformamide (DMF) at ambient temperature. This solution is poured into 500 cm$^3$ of water; it is filtered and washed 3 times with 300 cm$^3$ of water each time, and dried at 60° C/100 mm Hg. A sulphonated polysulphone is thus obtained.

Several polymers are prepared in this way, the reduced specific viscosity (RV) and the proportion of sulphonic acid groups (Sulph. ac.) of which are indicated in Tables I to III. The reduced specific viscosity is measured in a 2 g/l solution in DMF and is expressed in cm$^3$/g.

Various solutions of these polysulphones are prepared; the nature and the proportions of the solvents and the concentration of these solutions are given in the Tables which follow.

Each of the solutions is cast on a glass plate, and then the film thus formed is gelled. The gelling conditions are indicated hereafter. "Air" indicates that the film was simply left in air at the indicated temperature; "dry N$_2$" indicates that the film was placed in a chamber which was flushed with a current of dry nitrogen; "CO$_2$" indicates that the film was placed on a bed of solid carbon dioxide so as to lower the temperature of the film as indicated. The films are then immersed in a coagulation bath. The composition of the bath, the temperature and the duration of the immersion are also indicated in the Tables. The thickness of the membranes after coagulation (T) and the thickness of the dense layer (t), determined as indicated above, are also given.

The membranes then undergo a treatment to modify their osmotic properties. To do this, the membranes are immersed in a solution containing 100 g of water per 50 g of sodium nitrate.

The membranes described above are used for the desalination, by reverse osmosis, of a brine containing 35 g of NaCl/liter. The device used is that described in "Reverse Osmosis," S. SOURIRAJAN, LOGOS PRESS Limited, 1970, p.26. The flow rate and the degree of salt rejection are indicated in the Tables which follow. During the reverse osmosis, the temperature of the brine is 24° C, the pressure is 60 bars, the rate of recirculation of the brine is 43 liters/hour, and the duration of the operation is 2 hours to 12 hours.

It should be noted that all the membranes produced in these various Examples show, on their porous face, pores of average diameter of between 0.1 and 1 $\mu$, and their dense face does not show a single pore when examined under an electron microscope at a magnification of 20,000.

It should be noted that all the experiments given in the Tables were carried out on polymers possessing —$NaSO_3$ groups with the exception of Example 19 where there were —$HSO_3$ groups.

EXAMPLE 20

A membrane prepared under the conditions indicated in Example 19 is used. After coagulation, this film is not treated further. This membrane is used for the ultrafiltration of a 1 g/l solution of bovine albumin of molecular weight 70,000 under a pressure of 2 bars. The degree of rejection observed is 100% and the flow rate is 475 1/day.m².

EXAMPLE 21

A membrane prepared as described in Example 13 and the characteristics of which, measured under the abovementioned conditions, are: flow rate = 1450 1/day.m², degree of rejction = 78.8%, is dried by being exposed to the ambient atmosphere for 24 hours. After rehumidification by immersion in water at 20° C for 30 minutes, the new characteristics of this membrane are: flow rate: 1,100 1/day.m²; degree of rejection: 75%.

This test illustrates the ability of the membranes of this invention to be dried without substantially affecting their properties.

(TABLE I)

| Ex. | Polymer RV cm³/g | Polymer Sulph. ac. meq/g | Casting solution Solvent Nature | Casting solution Proportions | Casting solution Concentration % | Gelling Medium | Gelling Temp °C | Gelling Duration minutes | Coagulation Nature of the bath and duration of the treatment | Coagulation Temp °C | Membrane E $\mu$ | Membrane e $\mu$ | Modification treatment Temp °C | Modification treatment Duration | Flow rate (l/day.m²) | Degree of rejection of salt (%) |
|---|---|---|---|---|---|---|---|---|---|---|---|---|---|---|---|---|
| 1 | 79 | 0.97 | DMF | — | 50% | $CO_2$ | −10° | 3 | Water | −5° | 140 | 0.13 | 135 | | 480 | 82.1 |
| 2 | " | " | DMF | — | 50% | $CO_2$ | −10° | 3 | 100 | −10° | 150 | 0.12 | 135 | | 520 | 80.1 |
| 3 | " | " | DMF | — | 50% | $CO_2$ | −10° | 3 | parts | −10° | 150 | 0.07 | 130 | 15 min-utes | 850 | 80.9 |
| 4 | " | " | DMF | — | 50% | $CO_2$ | −10° | 3 | DMF | −15° | 140 | 0.18 | 140 | | 330 | 87 |
| 5 | " | " | DMF +$CH_2Cl_2$ | 90 10 | 50% | air | 20° | 3 | 100 parts | 0° | 150 | 0.20 | 135 | | 300 | 87.4 |
| 6 | " | " | DMF +$CH_2Cl_2$ | 80 10 | 40% | dry $N_2$ | 20° | 3 | $NaNC_3$ 50 | −10° | 110 | 0.14 | 135 | | 430 | 75.7 |
| 7 | " | " | DMF +$CH_2Cl_2$ | 80 20 | 40% | dry $N_2$ | 20° | 3 | parts Dura- | −10° | 130 | 0.08 | 135 | | 750 | 88.5 |
| 8 | " | " | DMF +$CH_2Cl_2$ | 80 20 | 40% | dry $N_2$ | 20° | 1 | tion 20 | 0° | 140 | 0.08 | 135 | | 770 | 79.8 |
| 9 | " | " | DMF +$CH_2Cl_2$ | 80 20 | 40% | dry $N_2$ | 20° | 3 | min-utes | 0° | 140 | 0.05 | 135 | | 1,140 | 85.9 |

(TABLE II)

| Ex. | Polymer RV cm³/g | Polymer Sulph. ac. meq/g | Casting solution Solvent Nature | Casting solution Proportions | Casting solution Concentration % | Gelling Medium | Gelling Temp °C | Gelling Duration minutes | Coagulation Nature of the bath and duration of the treatment | Coagulation Temp °C | Membrane E $\mu$ | Membrane e $\mu$ | Modification treatment Temp °C | Modification treatment Duration | Flow rate (l/day.m²) | Degree of rejection of salt (%) |
|---|---|---|---|---|---|---|---|---|---|---|---|---|---|---|---|---|
| 10 | 84 | 1.04 | DMF +$CH_2Cl_2$ | 80 20 | 40% | dry $N_2$ | 20° | 1 | Water 100 | 0° | 160 | 0.09 | 135 | | 680 | 81.5 |
| 11 | 69.5 | 0.97 | DMF +$CH_2Cl_2$ | 80 20 | 40% | dry $N_2$ | 20° | 1 | parts DMF | −10° | 140 | 0.085 | 135 | | 720 | 78.7 |
| 12 | 84 | 1.04 | DMF +$CH_2Cl_2$ | 80 20 | 40% | dry $N_2$ | 20° | 1 | 100 parts | −10° | 150 | 0.09 | 138 | 15 min-utes | 668 | 88.7 |
| 13 | " | " | DMF +$CH_2Cl_2$ | 80 20 | 40% | dry $N_2$ | 20° | 1 | $NaNo_3$ 50 | 0° | 140 | 0.04 | 135 | | 1500 | 81.9 |
| 14 | " | " | DMF +$CH_2Cl_2$ | 80 20 | 40% | dry $N_2$ | 20° | 1 | parts Dura- | +10° | 130 | 0.03 | 135 | | 2200 | 77.4 |
| 15 | " | " | DMF +$CH_2Cl_2$ | 80 20 | 40% | dry $N_2$ | 20° | 1 | tion 20 | +20° | 140 | 0.09 | 135 | | 680 | 81.0 |
| 16 | " | " | DMF +$CH_2Cl_2$ | 80 20 | 40% | dry $N_2$ | 20° | 1 | min-utes | 0° | 120 | 0.12 | 138 | | 500 | 92.1 |

(TABLE III)

| | Polymer | | Solvent | | Con-cen-tra-tion % | Gelling | | Dura-tion min-utes | Coagulation Nature of the bath and dura-tion of the treat-ment | Temp °C | Membrane | | Modification treatment | | Flow rate (l/day. m²) | De-gree of re-jec-tion of salt (%) |
|---|---|---|---|---|---|---|---|---|---|---|---|---|---|---|---|---|
| Ex. | RV cm³/g | Sulph. ac. meq/g | Nature | Pro-por-tions | | Med-ium | Temp °C | | | | E μ | e μ | Temp °C | Dura-tion | | |
| 17 | 56 | 0.84 | DMF +CH₂Cl₂ | 80 20 | 40% | dry N₂ | 20° | 1 | Water 100 DMF 10 NaNO₃ 50 Duration 15 minutes | 0° | 300 | 0.22 | 135 | | 270 | 79.0 |
| 18 | 70 | 0.86 | DMF +CH₂Cl₂ | 80 20 | 30% | CO₂ | −10° | 1 | Water 100 DMF 50 NaNO₃ 50 Duration 15 minutes | 0° | 120 | 0.22 | 127 | 15 min-utes | 276 | 77.5 |
| 19 | 70 | 0.92 | DMF +CH₂Cl₂ | 80 20 | 40% | CO₂ | −10° | 1 | Water 100 DMF 50 NaNO₃ 50 Duration 15 minutes | 0° | 180 | 0.07 | 135 | | 865 | 80.3 |

I claim:

1. Process for preparing an anisotropic sulphonated polyaryl ether/sulphone membrane by casting a solution of the polymer on a support, immersing the supported film in a coagulating bath and then recovering the film, in which:
   a. the sulphonated polyaryl ether/sulphone used possesses between about 0.3 and 2 meg/g of sulphonic acid groups and a reduced specific viscosity of between about 40 and 200 cm³/g (measured as a 2 g/l solution in DMF at 25° C);
   b. the concentration of the casting solution is between about 5 and 60% w/v;
   c. the coagulation bath comprises, per 100 parts of water, about 5 to 100 parts of a salt formed by an anion of a strong inorganic acid and a metal cation and about 1 to 120 parts of a solvent for the polymer;
   d. the temperature of the coagulation bath is between about −30° and +30° C;
   e. the period of immersion in the coagulation bath is between about 30 seconds and 60 minutes; and
   f. the immersion of the film in the coagulation bath is preceded by gelling the polymer layer.

2. Process according to claim 1 in which the sulphonated polyaryl ether/sulphone contains a plurality of units of the formula

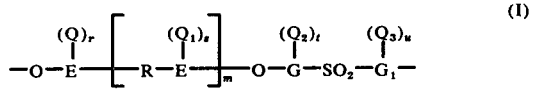

(I)

and, optionally, units of the formula

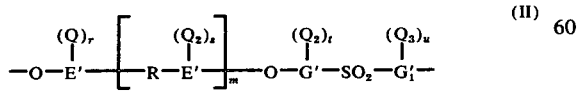

(II)

in which:
each of E, G, and G₁, which may be identical or different, is an aromatic group at least one of which contains, as a substituent, one or more sulphonic acid groups, the number of sulphonic acid groups attached to each aromatic group being the same or different:
each of E', G' and g₁' which may be identical or different, is the same as E, G and G₁ except that it does not contain sulphonic acid groups;
each of Q and Q₁, which may be identical or different, represents a substituent which is inert to sulphonation;
each of Q₂ and Q₃, which may be identical or different, represents an electron-attracting group;
each of r, s, t and u, which may be identical or different, is O or an integer from 1 to 4 inclusive, at least one of them being less than 4;
m is 0 or 1; and
R represents a valency bond or a radical selected from —CO—, —O—, —SO₂— and divalent organic hydrocarbon radicals.

3. Process according to claim 2 in which Q and/or Q₁ represents an alkyl radical of 1 to 4 carbon atoms or a halogen atom.

4. Process according to claim 2 in which Q₂ and/or Q₃ represents a nitro, phenylsulphone, alkylsulphone, trifluoromethyl, nitroso or pyridyl group.

5. Process according to claim 2 in which R represents an alkylene, alkylidene, cycloalkylene or arylene radical having less than 7 carbon atoms.

6. Process according to claim 2 in which E, G and G₁ each represents a p-phenylene radical at least one of which carries one or more sulphonic acid groups, E', G' and g₁' each represents a p-phenylene radical, r, s, t and u are O, m is 1 and R represents

7. Process according to claim 1 in which the casting solution contains one or more solvents for the polymer which are aprotic polar solvents, 0 to 50%, based on the total weight of the liquid, of a solvent or swelling agent for the polymer, of boiling point less than about 90° C, and 0 to 10%, based on the total weight of the liquid, of a non-solvent for the polymer.

8. Process according to claim 7 in which the aprotic solvent is dimethylformamide and the solvent having a boiling point less than 90° C is dichloromethane.

9. Process according to claim 1 in which the coagulation is carried out at a temperature of between −20° and +20° for between 10 and 30 minutes.

10. Process according to claim 1 in which the solution is cast onto a support which is covered by a woven, non-woven or knitted fabric, this fabric becoming incorporated in the membrane.

11. Process according to claim 1 in which the membrane is heat-treated.

12. Process according to claim 11 in which the heat treatment consists of treating the membrane for 1 to 60 minutes with an aqueous soltuion of an inorganic salt, at a temperature of between 100° and 150° C.

13. Process according to claim 1 in which the membrane is also dehydrated.

14. Process according to claim 13 in which the membrane is dehydrated with a compound or mixture of compounds containing at least on alcoholic OH group for between about 10 seconds and 24 hours at a temperature of between about 20° and 80° C.

* * * * *